UNITED STATES PATENT OFFICE.

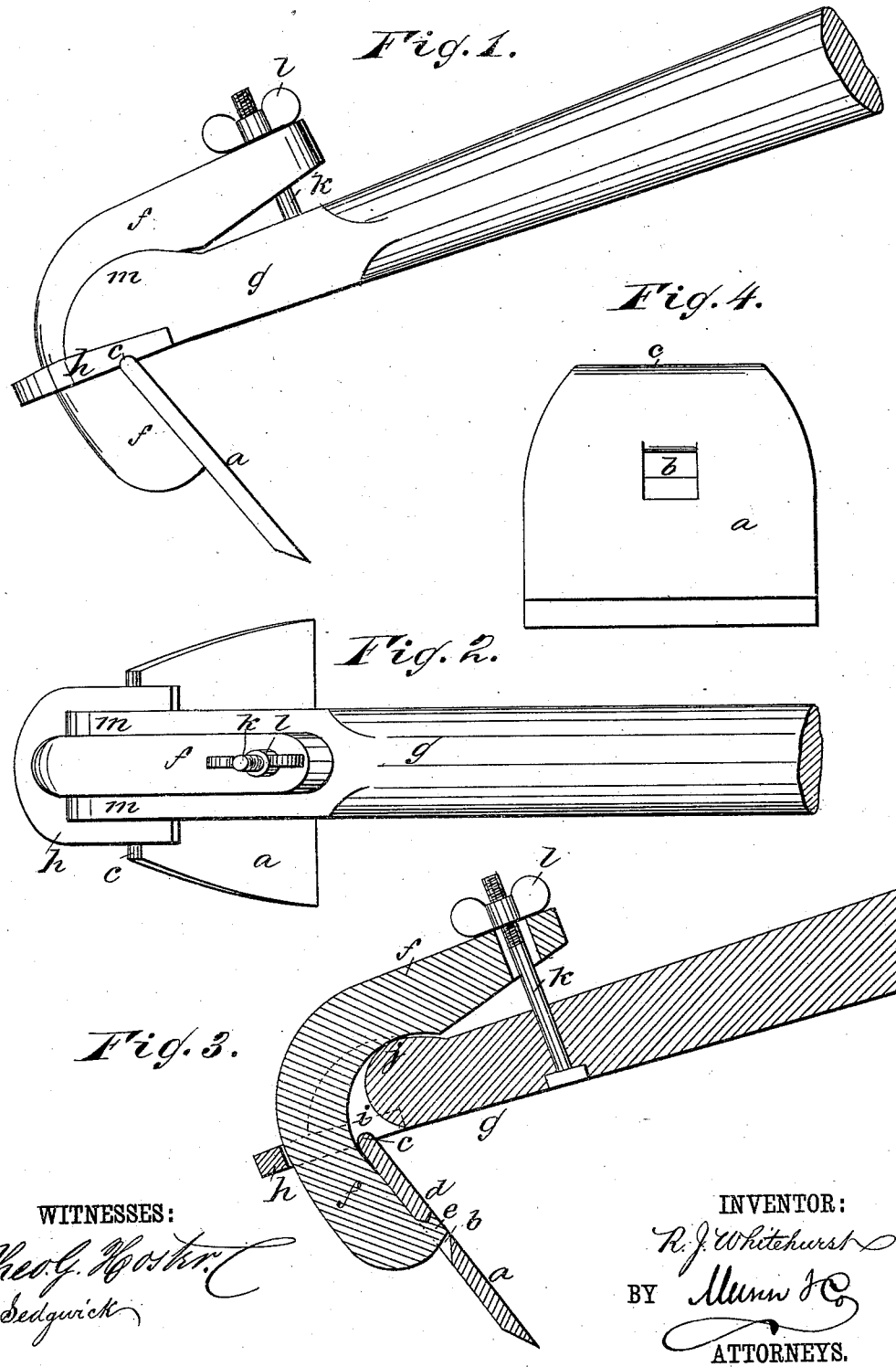

ROBERT J. WHITEHURST, OF CLEAR WATER HARBOR, FLORIDA.

HOE.

SPECIFICATION forming part of Letters Patent No. 313,972, dated March 17, 1885.

Application filed July 21, 1883. (No model.)

*To all whom it may concern:*

Be it known that I, ROBERT J. WHITEHURST, of Clear Water Harbor, Hillsborough county, Florida, have invented a new and Improved Attaching Device for Hoes and other Implements, of which the following is a full, clear, and exact description.

The object of the invention is to provide a more efficient, reliable, and substantial means of fastening hoes and like implements to the handles than the common key or wedge device.

It consists of a shank detachably connected to the hoe, inserted through an eye of the handle, and resting on a fulcrum, over which it extends upward along the handle, and a binding screw and nut connecting the upper end of the shank to the handle, so as to draw the shoulders of the blade up against the under side of the handle by straining the shank over the fulcrum, binding the hoe fast and firm, but at the same time so that it can be readily taken off by unscrewing the nut, when desired, all as hereinafter fully described.

Reference is to be had to the accompanying drawings, forming part of this specification, in which similar letters of reference indicate corresponding parts in all the figures.

Figure 1 is a side elevation of a hoe with the improved attaching device. Fig. 2 is a plan view of the hoe with said attaching device. Fig. 3 is a longitudinal sectional elevation, and Fig. 4 is a back view of the hoe-blade.

I make the blade $a$ with an opening, $b$, through it, and with an oval upper edge, $c$, the upper wall, $d$, of the opening through the blade being beveled or edged, so that the hook-point $e$ of the shank $f$, having a corresponding crease or groove, will secure and hold the blade firmly between said hook and the grooved under side of the hoe-handle $g$, or a plate, $h$, attached to said handle, when the shank is strained so as to draw the top or shoulders of the blade $a$ into the groove of said plate or handle, which is effected by the upper portion of said shank, which, after extending through the slot $i$ in said plate or handle, curves upward along the handle, over and resting on a boss, $j$, of the handle, forming a fulcrum, over which the shank may be strained by a bolt, $k$, and thumb-nut $l$, secured to the handle and connected to the shank.

The shank may be protected from lateral play by an ear or lug, $m$, of the handle, projecting each side of the shank $f$.

In practice the plate $h$ and the ears $m$ may be forged on the end of a metallic socket for the end of a wood handle; or the ears or lugs may be formed on the end of a wood handle, and a metallic plate, $h$, may be attached.

It will be seen that, besides affording a substantial means of connecting the hoe-blade without the use of wooden keys or wedges, the contrivance enables the blades to be applied and detached at will, by which blades of different forms or kinds may be applied as may be desired.

The plate $h$, or its equivalent part of the handle, may be slotted through to the end back of the hook $f$ for greater facility of applying and removing the hook, and the hook may have a stud projecting from each side, which studs will rise into notches in the under side of plate $h$ when the hook is put in place, to prevent the hook from dropping out of the slot when the nut $l$ is slackened for changing or adjusting the blade $a$.

Having thus described my invention, I claim as new and desire to secure by Letters Patent—

1. The combination, with a handle-socket or handle having a slotted extension and a boss on its upper surface, of the shank $f$, provided with a hooked point, $e$, the blade $a$, provided with the opening $b$, and the clamping-bolt and nut $k$ $l$, substantially as herein shown and described.

2. The ears or lugs $m$ of the handle $g$, in combination with the shank $f$, which rests on fulcrum $j$, extends through the handle, hooks onto the hoe-blade, and is provided with a binding-screw, $k$, and nut $l$, substantially as described.

ROBERT J. WHITEHURST.

Witnesses:
ALBERT WILCOX,
MAGGIE WHITEHURST.